(12) United States Patent
Porat (10) Patent No.: US 9,386,485 B2
(45) Date of Patent: Jul. 5, 2016

(54) ADAPTIVE RE-ESTABLISHMENT OF DATA SESSIONS

(71) Applicant: Marvell International Ltd., Hamilton (BM)

(72) Inventor: Tal Porat, Jerusalem (IL)

(73) Assignee: MARVELL INTERNATIONAL LTD, Hamilton (BM)

( * ) Notice: Subject to any disclaimer, the term of this patent is extended or adjusted under 35 U.S.C. 154(b) by 103 days.

(21) Appl. No.: 14/092,959

(22) Filed: Nov. 28, 2013

(65) Prior Publication Data

US 2014/0155068 A1 Jun. 5, 2014

Related U.S. Application Data

(60) Provisional application No. 61/731,650, filed on Nov. 30, 2012.

(51) Int. Cl.
*H04W 36/00* (2009.01)
*H04W 76/02* (2009.01)
*H04W 36/24* (2009.01)

(52) U.S. Cl.
CPC ........ *H04W 36/0055* (2013.01); *H04W 76/028* (2013.01); *H04W 36/245* (2013.01)

(58) Field of Classification Search
USPC ......................................................... 455/437
See application file for complete search history.

(56) References Cited

U.S. PATENT DOCUMENTS

| 8,805,374 | B2 * | 8/2014 | Zhu ....................... H04W 36/36 455/436 |
| 2008/0261600 | A1 * | 10/2008 | Somasundaram et al. .... 455/436 |
| 2009/0117892 | A1 | 5/2009 | Nader |
| 2011/0053595 | A1 | 3/2011 | Snow et al. |
| 2012/0120922 | A1 * | 5/2012 | Huang .................. H04W 36/24 370/332 |
| 2012/0230305 | A1 * | 9/2012 | Barbu .................... H04W 48/20 370/338 |
| 2013/0012212 | A1 * | 1/2013 | Murakami .......... H04W 36/245 455/439 |
| 2013/0090115 | A1 * | 4/2013 | Deivasigamani et al. .... 455/434 |
| 2013/0308482 | A1 * | 11/2013 | LeBlanc et al. ............... 370/252 |
| 2014/0228029 | A1 * | 8/2014 | Wen ..................... H04W 36/245 455/436 |
| 2014/0335870 | A1 * | 11/2014 | Yilmaz ................. H04W 36/32 455/441 |
| 2015/0146689 | A1 * | 5/2015 | Fu ......................... H04J 3/0632 370/331 |

FOREIGN PATENT DOCUMENTS

WO 2012065646 A1 5/2012

OTHER PUBLICATIONS

European Application # 13195064.4 Search Report dated Apr. 29, 2014.

(Continued)

*Primary Examiner* — Jinsong Hu
*Assistant Examiner* — Jean Chang (57) ABSTRACT

A method includes, in a mobile communication terminal, holding a definition of multiple re-establishment modes, each re-establishment mode defining a respective criterion for selecting a base station with which to re-establish a failed data session. Success statistics of one or more of the re-establishment modes in a given geographical region are collected in the terminal. In response to a failure in a data session occurring while the terminal is in the given geographical region, a re-establishment mode is selected from among the multiple re-establishment modes based on the success statistics, and the data session is re-established using the selected re-establishment mode.

20 Claims, 2 Drawing Sheets

(56) References Cited

OTHER PUBLICATIONS

3GPP TS 36.300, "3rd Generation Partnership Project;Technical Specification Group Radio Access Network; Evolved Universal Terrestrial Radio Access (E-UTRA) and Evolved Universal Terrestrial Radio Access Network (E-UTRAN);Overall description;Stage 2", Release 11, Version 11.3.0, pp. 1-205, Sep. 26, 2012.

3GPP TS 36.331, "3rd Generation Partnership Project;Technical Specification Group Radio Access Network;Evolved Universal Terrestrial Radio Access (E-UTRA);Radio Resource Control (RRC);Protocol specification", Release 11, Version 11.5.0, pp. 1-347, Sep. 19, 2013.

3GPP TS 36.304, "3rd Generation Partnership Project;Technical Specification Group Radio Access Network;Evolved Universal Terrestrial Radio Access (E-UTRA); User Equipment (UE) procedures in idle mode", Release 11, Version 11.5.0, pp. 1-34, Sep. 19, 2013.

3GPP TS 33.401, "3rd Generation Partnership Project;Technical Specification Group Services and System Aspects; 3GPP System Architecture Evolution (SAE);Security architecture", Release 12, Version 12.9.0, Section 7.4.3 (pp. 45-46), Sep. 20, 2013.

* cited by examiner

US 9,386,485 B2

ADAPTIVE RE-ESTABLISHMENT OF DATA SESSIONS

CROSS-REFERENCE TO RELATED APPLICATIONS

This application claims the benefit of U.S. Provisional Patent Application 61/731,650, filed Nov. 30, 2012, whose disclosure is incorporated herein by reference.

FIELD OF THE DISCLOSURE

The present disclosure relates generally to communication systems, and particularly to methods and systems for adaptive re-establishment of data sessions.

BACKGROUND

In many communication systems, a mobile communication terminal may be engaged in a communication session with a base station over a radio link whose conditions are not stable and vary over time. Occasionally, the conditions of the link deteriorate, and the reception quality at the terminal sometimes degrades to an unacceptable level, causing the communication session to drop. Additional reasons for session drop include, for example, communication protocol errors, failure in security protocols, and handover failure. In some communication systems, to prevent dropping the session, the terminal tries to retain the session by re-establishing the connection with an alternative base station with which the quality of the radio link is possibly better.

Re-establishment of data sessions is specified, for example, in Evolved Universal Terrestrial Radio Access (E-UTRA) systems, also referred to as Long Term Evolution (LTE) systems. The Third Generation Partnership Project (3GPP) E-UTRA standards specify re-establishment procedures for use by E-UTRA User Equipment (UE) and base stations (BS or eNodeB). These schemes are described, for example, in 3GPP Technical Specification 36.331, entitled "Technical Specification; LTE; Evolved Universal Terrestrial Radio Access (E-UTRA); Radio Resource Control (RRC); Protocol specification," (3GPP TS 36.331 version 11.5.0 Release 11), September, 2013, and in 3GPP Technical Specification 36.304, entitled "Technical Specification; LTE; Evolved Universal Terrestrial Radio Access (E-UTRA); User Equipment (UE) procedures in idle mode," (3GPP TS 36.304 version 11.5.0 Release 11), September, 2013, which are both incorporated herein by reference.

The description above is presented as a general overview of related art in this field and should not be construed as an admission that any of the information it contains constitutes prior art against the present patent application.

SUMMARY

An embodiment that is described herein provides a method including, in a mobile communication terminal, holding a definition of multiple re-establishment modes, each re-establishment mode defining a respective criterion for selecting a base station with which to re-establish a failed data session. Success statistics of one or more of the re-establishment modes in a given geographical region are collected in the terminal. In response to a failure in a data session occurring while the terminal is in the given geographical region, a re-establishment mode is selected from among the multiple re-establishment modes based on the success statistics, and the data session is re-established using the selected re-establishment mode.

In some embodiments, collecting the success statistics includes recording success rates of the respective re-establishment modes. In other embodiments, the method further includes initially operating the terminal in a learning phase in which the terminal collects the success statistics but does not select the re-establishment mode based on the success statistics, and subsequently switching to operate the terminal in an adaptive phase in which the terminal selects the re-establishment mode based on the success statistics. In yet other embodiments, the method includes continuing to update the success statistics while operating in the adaptive phase.

In an embodiment, holding the definition includes defining a given re-establishment mode that re-establishes the failed data session with a same base station with which the failed data session has failed. In another embodiment, holding the definition includes defining a given re-establishment mode that re-establishes the failed data session with a neighbor base station on a same radio frequency on which the failed data session has failed.

In yet another embodiment, holding the definition includes defining a given re-establishment mode that re-establishes the failed data session with a neighbor base station on a radio frequency that differs from the frequency on which the failed data session has failed. In further yet another embodiment, holding the definition includes defining a given re-establishment mode that re-establishes the failed data session with a strongest neighbor base station.

There is additionally provided, in accordance with an embodiment that is described herein, apparatus including a transceiver and processing circuitry. The transceiver is configured to communicate with base stations so as to hold data sessions. The processing circuitry is configured to hold a definition of multiple re-establishment modes, each re-establishment mode defining a respective criterion for selecting a base station with which to re-establish failed data sessions, to collect success statistics of one or more of the re-establishment modes in a given geographical region, and, in response to a failure in a data session occurring while in the given geographical region, to select a re-establishment mode from among the multiple re-establishment modes based on the success statistics and to re-establish the data session using the selected re-establishment mode.

The present disclosure will be more fully understood from the following detailed description of the embodiments thereof, taken together with the drawings in which:

DETAILED DESCRIPTION OF EMBODIMENTS

In LTE systems, when the quality of a data session degrades to an unacceptable level, or in response to other events such as communication protocol errors, security protocol failure, or handover failure, the user equipment (UE) attempts to re-establish the connection with the same or another Base Station (BS—also referred to as cell, NodeB or eNodeB). The cell in which the data session has failed is referred to herein as a source cell, and the cell with which the UE tries re-establishment is referred to herein as a target cell.

In LTE, re-establishment with a given target cell can succeed only if the network has prepared the given target cell for re-establishment with the specific UE beforehand. Procedures for preparation for re-establishment are described, for example, in section 7.4.3 of 3GPP Technical Specification 33.401, entitled "3rd Generation Partnership Project; Technical Specification Group Services and System Aspects; 3GPP System Architecture Evolution (SAE); Security architecture," (3GPP TS 33.401, version 12.9.0), September, 2013, which is incorporated herein by reference.

Network operators have the freedom to apply different strategies for selecting which cells to prepare for re-establishment. In some cases these strategies may differ among different areas within the same network, such as in different tracking areas (TAs) of the network.

In principle, the UE can try re-establishment with the strongest neighboring cell (i.e., with the cell whose signals the UE received the best prior to the failure event.) This strategy does not always achieve high performance: Since the UE is typically unaware of which of its neighboring cells were previously prepared by the network for re-establishment, the UE may attempt to re-establish the session with a strong yet unprepared cell. The cell in such a case will reject the re-establishment attempt, typically leading to dropping the session, causing non-continuous service provision to the user.

Embodiments that are described herein provide improved methods and devices for the re-establishment of data sessions in mobile communication terminals. The disclosed techniques reduce the probability of trying re-establishment with an unprepared cell, and therefore reduce the probability of dropping data sessions that are failing. In the disclosed techniques, the selection of target cells (with which to attempt re-establishment) is based on the success statistics of previous re-establishment attempts in the same geographical area (e.g., in the same network TA).

In an embodiment, the UE operates in two phases, referred to as a learning phase and an adaptive phase. In the learning phase, when the UE first enters a new network or a network area for which the UE has no sufficient statistics on previous re-establishment attempts, the UE selects the strongest neighboring cell. During the learning phase, the UE collects, per geographical area, the failure/success outcome events of the re-establishment attempts and logs these events in a Data Base (DB). In some embodiments, the UE uses the network TAs to define the geographical areas. The data stored in the DB include, for example, the identifiers of the source and target cells, and the respective success/failure outcome.

When the UE has collected sufficient statistics for success/failure outcomes in a given geographical area, the UE transitions to the adaptive phase (for that area). In the adaptive phase, the UE continues to collect such success/failure statistics, but unlike in the learning phase, the UE selects a target cell for re-establishment based on the collected success statistics rather than simply selecting the strongest neighboring cell. The UE analyzes the re-establishment events logged in the DB to derive respective criteria for selecting target cells. A criterion for selecting a cell with which to re-establish a failed data session is also referred to as a re-establishment mode.

Examples of re-establishment modes include selecting the source cell to serve as the target cell, selecting the target cell only from among neighboring cells whose radio frequency is the same as (or in another mode—different from) the radio frequency of the source cell, and the like. As another example, in an embodiment, target cells with which the success or failure rate is especially high, are respectively included or excluded from the re-establishment mode. In some embodiments, the UE chooses different re-establishment modes in different network areas.

In an example embodiment, the UE occasionally switches between the adaptive mode and the learning mode. This feature enables the UE to adjust the re-establishment modes to track changes that may have occurred in the network behavior (e.g., regarding the preparation of cells for re-establishment) during the adaptive mode.

In the disclosed techniques, the UE bases the target cell selection on the success/failure statistics of actual re-establishment attempts. As a result, the selection decisions are adapted to the actual behavior of the network regarding the preparation of neighboring cell for re-establishment. Therefore, the probability that the UE re-establishes the connection with an unprepared cell, which results in dropping the data session, is significantly reduced.

Figure 1:
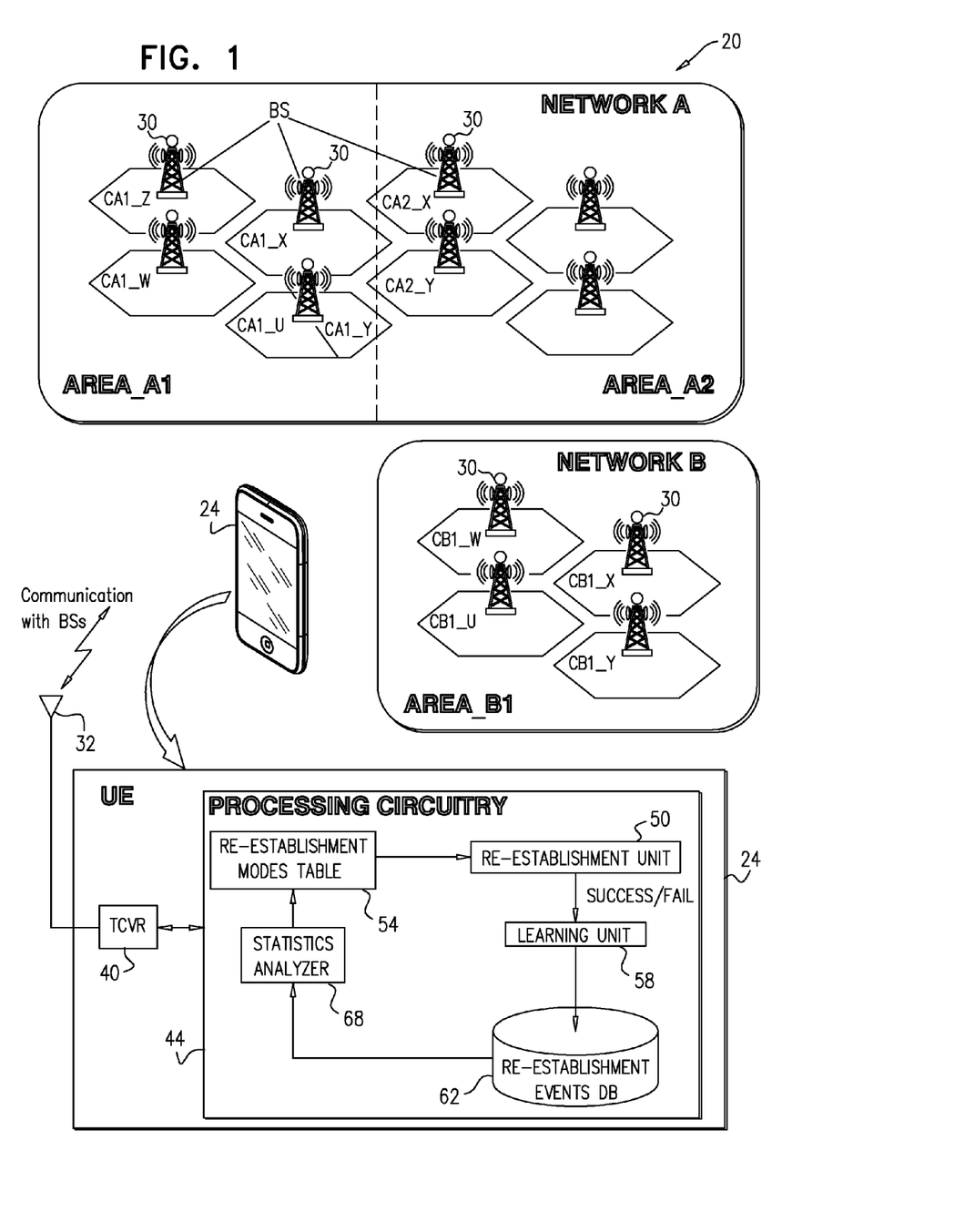
FIG. 1 is a block diagram that schematically illustrates a communication system, in accordance with an embodiment that is described herein.

FIG. 1 is a block diagram that schematically illustrates a communication system 20 that uses re-establishment of data sessions, in accordance with an embodiment that is described herein. In the present example, system 20 comprises an E-UTRA (LTE) system that operates in accordance with at least the TS 36.331 and TS 36.304 specifications, cited above. In alternative embodiments, however, system 20 may operate in accordance with any other suitable communication standard or specification that employs re-establishment of data sessions. For example, the UMTS Terrestrial Radio Access (UTRA) systems (also sometimes referred to as Wideband Code Division Multiple Access—WCDMA) include a re-establishment procedure, which is referred to as "CellUpdate".

System 20 comprises one or more communication networks, each comprising one or more Base Stations (BSs) 30. In the example of FIG. 1, system 20 comprises two networks, namely NETWORK A and NETWORK B. In some cases, the different networks are managed by different network operators. Each BS 30 is also referred to as a cell, NodeB (in UMTS) or eNodeB (in LTE). In some embodiments, system 20 comprises sectorial (as opposed to omnidirectional) BSs or cells. In the context of the present disclosure and in the claims, the term "Base Station" refers to both omnidirectional and sectorial BSs (or cells), as well as to other suitable BS configurations.

Typically, each BS or cell is configured at deployment time to a given transmission radio frequency or frequency band. In the context of the present disclosure and in the claims the term "radio frequency" refers to an individual frequency channel or to a frequency band. When frequency-hopping is used, the term "frequency" also refers to an individual frequency-hopping sequence.

System 20 further comprises a mobile communication terminal, in the present example an LTE UE 24. UE 24 communicates with one or more BSs 30. When communicating with a given BS, among other tasks, the UE receives from the BS downlink signals, which comprise reference signals and data-carrying signals. The data-carrying signals convey user data, signaling and other information from the BS to the UE. The reference signals comprise pilot signals that do not carry data or signaling, and are used for synchronization, channel estimation and other measurements.

In the example embodiment of FIG. 1, UE 24 comprises one or more antennas 32, a transceiver (TCVR) 40, which comprises receiving and transmitting parts, and processing circuitry 44. The receiving part of TCVR 40 receives the downlink signals from BSs 30, including the reference signals and the data-carrying signals, via antennas 32. In some embodiments, UE 24 supports multiple radio frequencies for reception. When initially establishing a data session with a given BS, UE 24 sets the receiving part of TCVR 40 to the radio frequency of the given BS. The transmitting part of TCVR 40 transmits to BS 30 uplink information, such as, for example, feedback information which the BS uses to enhance the spectral efficiency of the radio link.

The transmissions of each BS 30 cover an area in which UEs, such as UE 24, can receive the BS transmissions with acceptable quality. In FIG. 1, the coverage area of each BS 30 is depicted by a respective hexagonal area in the vicinity of the BS. In system 20, during an active communication session, such as a data session, the location of UE 24 is known to the network (or networks) at a cell granularity. In other words, the network is aware of the identity of the cell with which the UE communicates. When UE 24, however, is not engaged in an active communication session, e.g., while the UE is in idle state, the network tracks the location of the UE at granularity larger than cells. In LTE communication networks, the area covered by a group of cells or BSs that collectively define the UE location (e.g., when the UE is in idle state) is referred to as a tracking area (TA). The network operator usually defines TAs at network deployment. As described further below, in some embodiments UE 24 collects and analyzes success statistics of re-establishment attempts in separate geographical regions, e.g., as defined by the network TAs.

During an active data session, while receiving data sent from a given BS, UE 24 may discover that the quality of the radio link has degraded to an unacceptable level. In various embodiments, UE 24 uses any suitable method for detecting such radio link failures, for example by measuring a high error rate in the received data, and/or by detecting loss of synchronization with the BS transmissions.

According to the LTE specifications, to prevent dropping the session when the radio link fails, UE 24 should execute a suitable re-establishment procedure, in which the UE tries to re-establish the connection with an alternative BS (possibly even the same BS with which the data session has failed). In the description that follows, the term "source BS" (or source cell) refers to the BS with which the data session has failed, and the term "target BS" (or target cell) refers to a BS with which the UE tries to re-establish the connection.

In LTE, re-establishment with a given target BS can succeed only if the network prepared this target BS beforehand (i.e., before executing the re-establishment procedure), by providing the target BS with the active configuration of the UE. A BS that was not prepared for re-establishment with a given UE rejects re-establishment attempts by this UE, typically resulting in dropping the data session. In addition to session discontinuity, session drop typically incurs heavy signaling traffic for establishing an alternative new data session.

In the context of the present disclosure, the term "neighboring cells" refers to cells in the vicinity of the source cell, such as cells that are adjacent to the source cell, or cells in a wider area such as the respective TA to which the source cell belongs. Schemes for preparing neighboring cells for re-establishment with a given UE may differ among different networks and among different areas within a given network.

For example, in some networks, the network does not prepare for re-establishment any of the neighboring cells of the source cell (e.g., in the TA in which the UE resides) and therefore the UE can re-establish the connection only with the source cell itself. Other networks prepare one or more of the neighboring target cells (not necessarily all of the neighboring cells), regardless of whether the source and target cells were configured (at deployment) to the same or different radio frequency. Yet other networks prepare a neighboring target cell only if the source and target cells were configured to the same radio frequency. Further other networks do not limit re-establishment, and prepare all the neighboring cells of the source cell regardless of their configured radio frequency. Some network operators employ different schemes for preparing target cells for re-establishment based on location (e.g., according to the network TAs) within the same network. For example, in NETWORK A of FIG. 1, different cell preparation strategies can be enforced in AREA_1 and AREA_2.

When performing re-establishment, UE 24 first needs to select a target cell with which to re-establish the data session. The UE, however, does not receive from the network any indication as to which neighboring cells were prepared by the network. In other words, UE 24 cannot predict whether re-establishment with a given target cell will succeed or fail due to lack of preparation. In some embodiments, the UE chooses a re-establishment mode that is likely to be suitable for its current geographical location. The term "re-establishment mode" refers to a criterion that the UE uses for selecting a BS (or cell) with which to re-establish a failed data session.

In some embodiments, UE 24 employs a default selection criterion by selecting the strongest neighboring cell. If, however, the strongest cell was not previously prepared by the network, the cell rejects the re-establishment attempt and the data session drops. Thus, re-establishment with the strongest neighboring cell is not always the optimal strategy. Other re-establishment modes include, for example, selecting only the source cell, selecting only among neighboring cells (possibly among a partial set of the neighboring cells) that are configured to the same radio frequency as the source cell, and the like.

In the disclosed techniques, UE 24 uses target cell selection criteria that possibly differ from one geographical region of the network to another. UE 24 can use any suitable partitioning of the network BSs into geographical regions. In some embodiments, the geographical regions comprise the network TAs. In other embodiments, a geographical region comprises any suitable set of BSs such as all the BSs in a certain city district. In a multi-network environment, an entire network (e.g., NETWORK A and NETWORK B in FIG. 1) may be defined as a geographical region. UE 24 collects statistics regarding re-establishment success or failure events per such geographical regions, and uses these statistics to derive region-specific re-establishment modes that enable the UE to select target cells so as to improve the re-establishment success rate.

In the example implementation of FIG. 1, processing circuitry 44 in UE 24 comprises a re-establishment unit 50, which upon detecting that the data session has failed, tries to re-establish the failed data session with a selected target cell. Re-establishment unit 50 selects the target cell based on re-establishment modes that are previously stored in a re-establishment modes table 54. The re-establishment modes in table 54 are specified for respective geographical regions, and UE 24 selects the target cell using the re-establishment modes that are related to the geographical region in which the UE is currently located. In an embodiment, a learning unit 58 accepts from unit 50 the success or failure outcome of re-establishment attempts, and logs each respective event in a data base (DB) 62 of re-establishment events.

In an embodiment, when UE 24 enters a geographical region for which the UE has not yet gathered sufficient statistics on the re-establishment events (and therefore there are still no re-establishment modes stored in table 54 for that region), processing circuitry 44 enters a learning phase. During the learning phase, unit 50 does not select the re-establishment mode based on the success statistics, but rather selects by default the strongest target cell in the region, and possibly the next-strongest in case of additional failure. UE 24 then tries to re-establish the connection with the selected target cell.

As described above, learning unit 58 collects the outcomes of the re-establishment attempts and logs the events in DB 62. A statistics analyzer 68 monitors the amount of statistics (e.g., the number of collected events) gathered in DB 62 per geographical region. When in some region analyzer 68 finds that the statistics are sufficient, processing circuitry 44 switches from operating in the learning phase to operate in an adaptive phase.

Analyzer 68 can use any suitable method for deciding when the re-establishment statistics are sufficient for a given region. In some embodiments, analyzer 68 decides that the statistics are sufficient when the number of re-establishment events that were collected for the given geographical region exceeds a predefined threshold. In other embodiments, analyzer 68 decides on sufficient statistics when the success or failure rate (i.e., the ratio between the number of successful or failure attempts and the total number of attempts) in the given region is sufficiently high.

After the processing circuitry 44 switches to the adaptive phase, analyzer 68 uses the success statistics of the respective events in DB 62 to derive one or more re-establishment modes and stores these modes in table 54. During the adaptive phase, learning unit 58 continues to collect re-establishment events and to log them in DB 62, and analyzer 68 adaptively updates the respective re-establishment modes it stores in table 54, which over time are based on larger statistics. When operating in the adaptive phase, processing circuitry 44 occasionally (e.g., periodically) switches, for a limited duration, from the adaptive to the learning phase to track changes that may have occurred in the network behavior.

Based on the re-establishment events stored in DB 62, analyzer 68 produces respective re-establishment modes. Analyzer 68 can use any suitable analysis method to derive the re-establishment modes. For example, when analyzer 68 discovers that all the re-establishment attempts with the neighboring target cells have failed, the analyzer defines a re-establishment mode that re-establishes the failed data session with the source BS. Additionally or alternatively, the analyzer may include in the re-establishment mode target cells that belong to networks (deployed in the same region) that use other technology than LTE, such as UMTS or GSM.

As another example, when analyzer 68 finds that most of the re-establishment attempts with neighboring target cells that use the same radio frequency as the source cell have succeeded, but on the other hand all the attempts with a different radio frequency have failed, the analyzer defines a re-establishment mode that re-establishes the failed data session with a target cell that uses the same radio frequency as the source cell. As yet another example, when analyzer 68 finds that most of the re-establishment attempts with target cells that use a radio frequency other than the radio frequency of the source cell, the analyzer defines a re-establishment mode that re-establishes the failed data session with a neighboring cell that uses a radio frequency that differs from that of the source cell.

In some embodiments, analyzer 68 derives the re-establishment modes based on the re-establishment success rates, failure rates, or both. For example, when a given source cell succeeds to re-establish the connection only with a specific target cell, analyzer 68 derives a respective re-establishment mode that includes only that target cell, and accordingly, unit 50 performs re-establishment with that target cell even if there are stronger cells in the region. As another example, when analyzer 68 discovers that re-establishment with a certain target cell consistently fails, the analyzer derives a respective re-establishment mode that excludes that target cell.

As yet another example, when analyzer 68 discovers that, for example, n out of N re-establishment attempts succeeded with the source and target cells configured to the same radio frequency, analyzer 68 derives a re-establishment mode that selects the strongest cell among the target cells that have the same radio frequency as the source cell (as opposed to the strongest cell regardless of its radio frequency) in n/N of all the following re-establishment attempts. In all other attempts the re-establishment mode selects the strongest cell (regardless its radio frequency).

The UE and processing circuitry configurations shown in FIG. 1 are simplified example configurations, which are depicted solely for the sake of clarity. In alternative embodiments, any other suitable configuration can also be used. Some UE elements that are not mandatory for understanding of the disclosed techniques have been omitted from the figure for the sake of clarity. The different elements of the UE and processing circuitry may be implemented using dedicated hardware, such as using one or more Application-Specific Integrated Circuits (ASICs) and/or Field-Programmable Gate Arrays (FPGAs). Alternatively, some elements may be implemented using software executing on programmable hardware, or using a combination of hardware and software elements.

In some embodiments, some or all of the elements of given UE and processing circuitry, are fabricated in a chip-set. When implementing the disclosed techniques in software on a programmable processor, the software may be downloaded to the processor in electronic form, over a network, for example, or it may, alternatively or additionally, be provided and/or stored on non-transitory tangible media, such as magnetic, optical or electronic memory.

We now describe an example method for organizing, in DB 62, the success/failure events of the re-establishment attempts conducted by unit 50. As depicted in Tables 1-3 below, for each re-establishment attempt, learning unit 58 stores in DB 62, for both the source and target cells, the cell identity (CELL_ID) and radio frequency (FREQ), as well as the outcome of the respective re-establishment attempt (OUTCOME). The present example is related to NETWORK A and NETWORK B as depicted in FIG. 1. Additionally, we assume that NETWORK A and NETWORK B apply cell preparation schemes as described herein.

In the example of FIG. 1, NETWORK A comprises two geographical regions, namely, AREA_1 and AREA_2. AREA_1 comprises five cells whose IDs are denoted CA1_X, CA1_Y, CA1_U, CA1_W, and CA1_Z. Note that in the present example, the cells CA1_Y and CA1_U are sectorial cells of one BS. In AREA_A2 of NETWORK A, two cells denoted CA2_X and CA2_Y are marked in the figure. Similarly, NETWORK B comprises a single tracking area, denoted AREA_B1, which comprises the cells CB1_X, CB1_Y, CB1_U, and CB1_W.

In AREA_A1, NETWORK A prepares for re-establishment only cells that have the same radio frequency as the source cell. Moreover, in the present example, for CA1_Z as a source cell, the potential target cell CA1_W is excluded. As depicted in Table 1, whenever the source and target cells share the same radio frequency, re-establishment has succeeded. On the other hand, when the source and target cells use different radio frequency, re-establishment has failed. The IGNORED outcome indicates that the target cell has failed to respond to the re-establishment attempt.

TABLE 1 logged events for AREA_A1
NETWORK A - AREA_A1

| SOURCE | | TARGET | | |
|---|---|---|---|---|
| CELL_ID | FREQ | CELL_ID | FREQ | OUTCOME |
| CA1_X | F1 | CA1_X | F1 | SUCCEEDED |
| CA1_X | F1 | CA1_Y | F1 | SUCCEEDED |
| CA1_X | F1 | CA1_Y | F2 | FAILED |
| CA1_U | F2 | CA1_W | F2 | SUCCEEDED |
| CA1_Z | F2 | CA1_W | F1 | IGNORED |

In AREA_A2, NETWORK_A does not prepare for re-establishment any neighboring cells. As depicted in Table 2, as result, re-establishment succeeds only when the UE tries to re-establish the connection with the source cell itself and with the same radio frequency as the source cell.

TABLE 2 logged events for AREA_A2
NETWORK A - AREA_A2

| SOURCE | | TARGET | | |
|---|---|---|---|---|
| CELL_ID | FREQ | CELL_ID | FREQ | OUTCOME |
| CA2_X | F1 | CA2_X | F1 | SUCCEEDED |
| CA2_X | F1 | CA2_Y | F1 | FAILED |
| CA2_Y | F2 | CA2_Y | F1 | FAILED |
| CA2_X | F1 | CA2_Y | F2 | FAILED |

In contrast to the above two examples, in AREA_B1, NETWORK B does not impose any restrictions and prepares all the cells in AREA_B1 for re-establishment.

TABLE 3 logged events for AREA_B1
NETWORK B - AREA_B1

| SOURCE | | TARGET | | |
|---|---|---|---|---|
| CELL_ID | FREQ | CELL_ID | FREQ | OUTCOME |
| CB1_X | F1 | CB1_X | F1 | SUCCEEDED |
| CB1_X | F1 | CB1_Y | F1 | SUCCEEDED |
| CB1_X | F1 | CB1_Y | F2 | SUCEEDED |
| CB1_U | F2 | CB1_W | F2 | IGNORED |
| CB1_Z | F2 | CB1_W | F1 | SUCEEDED |

Figure 2:
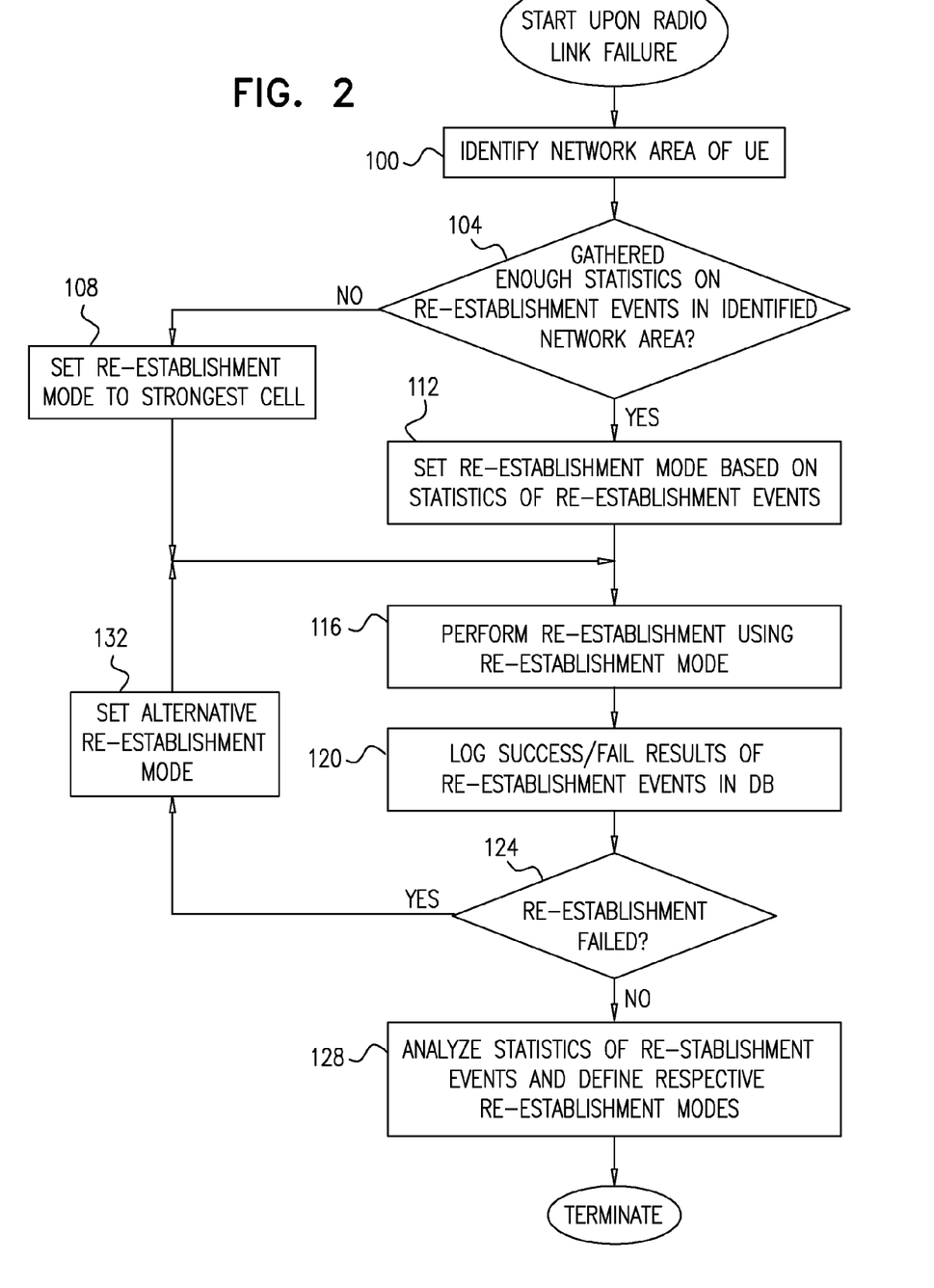
FIG. 2 is a flow chart that schematically illustrates a method for re-establishment of a data session, in accordance with an embodiment that is described herein.

FIG. 2 is a flow chart that schematically illustrates a method for re-establishment of a data session, in accordance with an embodiment that is described herein. The method is executed by processing circuitry 44 and is initiated upon data session failure. The method starts with processing circuitry 44 identifying the geographical area or region in which the UE resided, at a region identification operation 100.

In some embodiments, although not necessarily, UE 24 uses the tracking areas of the network as its partitioning into geographical regions. Processing circuitry 44 then checks whether the statistics gathered in DB 62 for the identified region are sufficient, at a sufficiency checking operation 104.

If the statistics at step 104 are still insufficient, processing circuitry 44 configures re-establishment unit 50 to select the strongest cell in the identified region (or possibly in only part of the identified region) at a strongest cell selection operation 108. Otherwise, the statistics at step 104 are regarded as sufficient, and processing circuitry 44 selects a respective re-establishment mode based on these statistics, at a re-establishment mode setting operation 112.

In some embodiments, re-establishment modes table 54 comprises one re-establishment mode per geographical region, and processing circuitry 44 selects the re-establishment mode based on the identified region at operation 100. In other embodiments, table 54 stores multiple re-establishment modes per geographical area. In such embodiments, processing circuitry 44 selects one of the re-establishment modes according to predefined priorities. In an embodiment, the processing circuitry first selects the re-establishment mode that is expected to result with the highest success rate, and reverts to other re-establishment modes if the first selection caused the re-establishment to fail.

At a re-establishment application operation 116, re-establishment unit 50 attempts re-establishment with the target cell selected according to the re-establishment mode that was set at operations 108 or 112 above. In an example embodiment, unit 50 performs the re-establishment procedure according to the TS 36.331 and TS 36.304 specifications, cited above. At a learning operation 120, learning unit 58 accepts from unit 50 the success or failure outcome of the re-establishment procedure and logs that event in DB 62. Tables 1-3 above describe an example of the content and formatting of the logged events during multiple re-establishment attempts.

At an outcome checking operation 124, the processing circuitry checks whether the re-establishment attempt has succeeded or failed. If the re-establishment attempt has failed, processing circuitry 44 sets a re-establishment mode other than the one that resulted in failure, at an alternative mode setting operation 132. The method then loops back to operation 116 to try re-establishment with the alternative re-establishment mode.

Processing circuitry 44 can use any suitable method for setting the alternative re-establishment mode. For example, in an embodiment, at operation 132 the alternative re-establishment mode selects the strongest neighboring cell. In another embodiment, processing circuitry 44 selects an alternative re-establishment in the identified region from table 54.

If at operation 124 the re-establishment procedure has succeeded, processing circuitry 44 proceeds to an analysis operation 128. At operation 128, statistics analyzer 68 analyzes the events logged in DB 62 for the identified region to derive new re-establishment modes, or to update already stored modes in table 54. Examples for re-establishment modes that may be derived by analyzer 68 are described above. Following the analysis at operation 128 the method then terminates.

In some embodiments, processing circuitry 44 enables only a single re-establishment attempt upon radio link failure, and drops the data session if this re-establishment attempt has failed. In such embodiments, processing circuitry 44 does not execute operation 132 (and possibly does not execute operation 124).

The techniques outlined above for data session re-establishment are described solely by way of example. In alternative embodiments, UE processing circuitry 44 may use various other techniques for re-establishing a failed data session. For example, in some embodiments, processing circuitry 44 occasionally skips operation 104 in FIG. 2 for a predefined duration or for a predefined number of re-establishment attempts, and forces selecting the strongest cell at step 108. This mechanism enables processing circuitry 44 to occasionally switch from the adaptive back to the learning phase, to track changes in the network behavior.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
   in a mobile communication terminal that communicates with base stations of a cellular network, holding a definition of multiple re-establishment modes, each re-establishment mode defining a respective criterion for selecting a base station with which to re-establish a failed data session;
   collecting in the mobile communication terminal success statistics of one or more of the re-establishment modes over a plurality of base stations; and
   in response to a failure in a data session occurring while the mobile communication terminal is in a given geographical region:
      based on the collected success statistics, selecting from among the multiple re-establishment modes a region-specific re-establishment mode that ensures that the mobile communication terminal, located in the given geographical region, will attempt to re-establish the data session only with a base station that has been notified in advance by the cellular network that the mobile communication terminal is expected to re-establish the data session therewith and therefore this base station will not reject the mobile communication terminal; and
      re-establishing the data session using the selected region-specific re-establishment mode.

2. The method according to claim 1, wherein collecting the success statistics comprises recording success rates of the respective re-establishment modes.

3. The method according to claim 1, comprising initially operating the mobile communication terminal in a learning phase in which the mobile communication terminal collects the success statistics but does not select the region-specific re-establishment mode based on the success statistics, and subsequently switching to operate the mobile communication terminal in an adaptive phase in which the mobile communication terminal selects the region-specific re-establishment mode based on the success statistics.

4. The method according to claim 3, comprising continuing to update the success statistics while operating in the adaptive phase.

5. The method according to claim 1, wherein holding the definition comprises defining a given re-establishment mode that re-establishes the failed data session with a same base station with which the failed data session has failed.

6. The method according to claim 1, wherein holding the definition comprises defining a given re-establishment mode that re-establishes the failed data session with a neighbor base station on a same radio frequency on which the failed data session has failed.

7. The method according to claim 1, wherein holding the definition comprises defining a given re-establishment mode that re-establishes the failed data session with a neighbor base station on a radio frequency that differs from the frequency on which the failed data session has failed.

8. The method according to claim 1, wherein holding the definition comprises defining a given re-establishment mode that re-establishes the failed data session with a strongest neighbor base station.

9. The method according to claim 1, wherein the mobile communication terminal does not receive from the network any indication as to which neighboring cells were notified in advance by the network.

10. An apparatus, comprising:
    a transceiver, which is configured to communicate with base stations of a cellular network so as to hold data sessions; and
    processing circuitry, which is configured to hold a definition of multiple re-establishment modes, each re-establishment mode defining a respective criterion for selecting a base station with which to re-establish a failed data session, wherein the processing circuitry comprises:
       learning circuitry, configured to collect success statistics of one or more of the re-establishment modes over a plurality of base stations;
       session re-establishment circuitry, configured, in response to a failure in a data session occurring while in a given geographical region, to select, based on the collected success statistics, from among the multiple re-establishment modes, a region-specific re-establishment mode that ensures that the processing circuitry, when the apparatus is located in the given geographical region, will attempt to re-establish the data session only with a base station that has been notified in advance by the cellular network that the apparatus is expected to re-establish the data session therewith and therefore this base station will not reject the apparatus, and to re-establish the data session using the selected region-specific re-establishment mode.

11. The apparatus according to claim 10, wherein the processing circuitry is configured to collect the success statistics by recording success rates of the respective re-establishment modes.

12. The apparatus according to claim 10, wherein the processing circuitry is configured to initially operate in a learning phase in which the processing circuitry collects the success statistics but does not select the region-specific re-establishment mode based on the success statistics, and subsequently to switch to operate in an adaptive phase in which the processing circuitry selects the region-specific re-establishment mode based on the success statistics.

13. The apparatus according to claim 12, wherein the processing circuitry is configured to continue to update the success statistics while operating in the adaptive phase.

14. The apparatus according to claim 10, wherein the processing circuitry is configured to hold the definition by defining a given re-establishment mode that re-establishes the failed data session with a same base station with which the failed data session has failed.

15. The apparatus according to claim 10, wherein the processing circuitry is configured to hold the definition by defining a given re-establishment mode that re-establishes the failed data session with a neighbor base station on a same radio frequency on which the failed data session has failed.

16. The apparatus according to claim 10, wherein the processing circuitry is configured to hold the definition by defining a given re-establishment mode that re-establishes the failed data session with a neighbor base station on a radio frequency that differs from the frequency on which the failed data session has failed.

17. The method according to claim 10, wherein the processing circuitry is configured to hold the definition by defining a given re-establishment mode that re-establishes the failed data session with a strongest neighbor base station.

18. A mobile communication terminal comprising the apparatus of claim 10.

19. A chipset for processing signals in a mobile communication terminal, comprising the apparatus of claim 10.

20. The apparatus according to claim 10, wherein the processing circuitry does not receive from the network, via the transceiver, any indication as to which neighboring cells were notified in advance by the network.

* * * * *